United States Patent Office 2,828,265
Patented Mar. 25, 1958

2,828,265
COMPLEX OF POLYOXYALKYLENE COMPOUNDS WITH METAL SALTS AND ORGANIC LIQUIDS THICKENED WITH SAME

Richard E. Van Strien, Hammond, Ind., assignor to Standard Oil Company, Chicago, Ill., a corporation of Indiana No Drawing. Application February 5, 1952
Serial No. 270,111

17 Claims. (Cl. 252—316)

This invention relates to novel compositions of matter comprising chemical complexes of polyoxyalkylene compounds with certain inorganic metal salts and to various liquid vehicles gelled or thickened by such complexes. More particularly the invention relates to such complexes prepared from polyoxyalkylene nonionic surface active compounds and the like.

Polyoxyalkylene compounds, in particular the polyoxyalkylene nonionic surface active agents, are usually liquid in form although waxy solids may be obtained in the very high molecular weight compounds of this type. Such compounds are usually prepared by reacting a more or less hydrophobic compound such as an alcohol, mercaptan, phenol etc., with a number of mols of a hydrophilic compound such as an alkylene oxide e. g. ethylene oxide. A review of this type of compound and related polyoxyalkylene compounds is set forth in "Surface Active Agents" by Schwartz et al., page 202 et seq. (Interscience Publishing Company—1949). Because the nonionics are normally liquid they have failed to receive the wide usage of the ionogenic agents which are normally solid, and this, despite the fact that for many purposes, the nonionics are superior. An object of the present invention, therefore, is to provide polyoxyalkylene compounds in general and polyoxyalkylene nonionic surfactant materials in particular in solid form. A further object is to provide a method of converting normally liquid polyoxyalkylene compounds to solids. An additional object is to provide novel complexes of polyoxyalkylene compounds with certain inorganic metal salts which vary from viscous liquids to hard solids. A still further object of the present invention is to provide a novel composition useful in the thickening or gelation of organic liquids such as petroleum fractions and the like. These and additional objects of the present invention will be apparent from the ensuing description.

Briefly, I have discovered that by reacting inorganic salts, of a hereinafter defined class, with polyoxyalkylene compounds, particularly the polyoxyalkylene nonionic type surface active agents that novel complexes ranging from viscous liquids to hard solids may be produced. Certain of these complexes are particularly useful as thickening agents for organic liquids such as petroleum fractions and the like. The solid complexes, particularly those prepared from a nonionic agent, may be molded or flaked and employed with advantage for their surface active properties.

The novel complexes of the present invention may be prepared by reacting an inorganic metal salt, of the class hereinafter described in detail, with an organic polyoxyalkylene compound conforming with the empirical formula:

$$RX_z[(C_mH_{2m}O)_n(C_mH_{2m})X'R']_y$$

wherein R may be hydrogen or an organic radical; R' may be hydrogen or an organic radical; X may be oxygen, sulfur, nitrogen, $$-\overset{O}{\underset{\|}{C}}-O-, \quad -NH-, \quad -\overset{O}{\underset{\|}{C}}-NH-, \quad \text{or} \quad -\overset{O}{\underset{\|}{C}}-N=$$

X' may be oxygen, $$-\overset{O}{\underset{\|}{C}}-O-, \quad -NH-, \quad \text{or} \quad -\overset{O}{\underset{\|}{C}}-NH-$$

$m$ is 2 or 3; $n$ is a positive integer from 1 to about 30; $y$ is a positive integer from 1 to 4; and $z$ is a positive integer from 1 to 4.

Compounds conforming to the above formula may be produced by the reaction of an alkylene oxide, such as ethylene oxide or propylene oxide, with a substantially hydrophobic organic compound having an active hydrogen group capable of reacting with such alkylene oxide. Thus, R and R' may be acyclic, alicyclic, aromatic, heterocyclic, etc. and may contain more than one hydrogen capable of reacting with an alkylene oxide, so that a plurality of $(C_mH_{2m}O)$ chains are present in the final product.

Examples of such hydrophobic compounds are alcohols, such as methanol, propanol, butanol, hexanol, octanol, nonanol, cyclohexanol, decanol, dodecanol, benzyl alcohol, the anhydrosorbitols, etc.; mercaptans, such as ethyl, amyl, butyl, hexyl, nonyl, cyclohexyl, decyl, lauryl, stearyl, benzyl, etc.; phenols, such as phenol, o-, m-, and p-cresol, o-, m-, and p-chlorophenol, guaiacol, etc.; carboxylic acids, such as acetic, formic, octanoic, butyric, lauric, benzoic, naphthenic, caprylic, hydroxybutric, glycolic, etc.; amines, such as methylamine, dimethylamine, n-propylamine, n-hexylamine, urea, dimethylurea, aniline, toluidine, α naphthylamine, hexanoylmethylglucamine, etc.; amides, such as acetamide, butyramide, valeramide, α naphthamide, stearamide, stearoyltrimethylolaminoethane, etc. Various derivatives of the above compounds may likewise be used, e. g. esters of the anhydrosorbitols, etc. Such hydrophobic compounds, in general, react with alkylene oxides to produce compounds conforming to the above formula and the polyoxyalkylene compounds thereby produced will form complexes in accordance herewith. It is preferred, however, to employ those polyoxyalkylene compounds wherein R and/or R' is at least 6 carbon atoms when the complex is employed to thicken an organic liquid, e. g. a petroleum fraction, and preferably, a sufficient number of carbon atoms to impart some measure of oil solubility to the complex, e. g. about 8 to about 30 carbon atoms.

Alkylene oxides may be reacted with water or an alkylene glycol to produce polyalkylene glycols which themselves will form complexes with the metal salts of the class hereinafter described. The mono- and diesters of such polyalkylene glycols likewise form complexes in accordance herewith. Those esters prepared, for example, by reacting a fatty acid having from about 6 to about 30 carbon atoms with a polyalkylene glycol are particularly suitable for the production of complexes useful as gelling agents for organic liquids. Polyalkylene glycols are commercially available in a wide range of molecular weights, those having a molecular weight below about 1000 being preferred in accordance herewith. Since neither the polyoxyalkylene compounds or their method of preparation constitutes a part of the present invention, further detail is unnecessary and it should be understood that whereas certain specific hydrophobic compounds have been described which are capable of reacting with alkylene oxides to produce polyoxyalkylene compounds suitable for use in accordance with the present invention, these have been enumerated by way of illustration and not of limitation. It should be emphasized that polyoxyalkylene compounds which conform to the empirical formula set forth above are suitable for use in accordance herewith regardless of their manner of preparation.

The manner in which the metal salt is bound to the polyoxyalkylene compound in accordance herewith, is not entirely understood nor is the structure of the complex produced known. Analyses by X-ray have established, however, that the salt is chemically bound to the organic compound in such a manner as to lose its identity, i. e., no free salt is detected. As an example, a complex prepared from 50 parts of $t\text{-}C_{12}H_{25}S(C_2H_4O)_{11}H$ and a water solution of 30 parts of $CaCl_2$ was examined by X-ray and found to be crystalline and to have no free salt or hydrate thereof. Secondary valence forces between the $(C_mH_{2m}O)$ groups and the salt, similar to those encountered in hydrates and alcoholates are believed to account for the formation of the complexes. The critical factor in the formation of these complexes appears to reside in the presence of a plurality of $(C_mH_{2m}O)$ groups in the organic compound and whereas the hydrophobic radicals will affect the characteristics of the ultimate complex it has been found that complexes may readily be produced with a wide range of polyoxyalkylene compounds wherein R and R' may vary from a hydrogen atom to complicated radicals containing many carbon atoms.

The metal salts which will form complexes with the above described compounds, in accordance with the present invention, are those which consist of a polyvalent metal and a monovalent anion, which salts are characterized by an ability to form an alcoholate with one or more mols of a low molecular weight alcohol, e. g. methanol or ethanol. Alcoholates are those compounds wherein one or more mols of an alcohol is bound to a mol of salt in a manner analogous to the hydrates wherein one or more mols of water of crystallization is bound to a mol of salt. An example of an alcoholate is

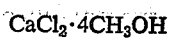

$CaCl_2 \cdot 4CH_3OH$

In addition to calcium chloride, metal salts typical of those which correspond to the above definition and which may be employed in accordance herewith are $MgCl_2$, $CuCl_2$, $ZnCl_2$, $CoCl_2$, $AlCl_3$, $CdCl_2$, $CaI_2$, $CaBr_2$, $Ca(NO_3)_2$, $CuBr_2$, $Ca(C_2H_3O_2)_2$, $MnCl_2$, etc. It should be understood that the suggestion of various specific salts herein is not intended to function expressly or impliedly for exclusion of other like compounds which form alcoholates and come within the definition hereinabove set forth.

The complexes of the present invention are preferably prepared by contacting a polyoxyalkylene compound with a water solution of a metal salt selected from the defined class. When the salt and the organic reactant are contacted in this manner the formation of the complex occurs readily at ambient temperatures, i. e., as low as about 60° F. The water is then removed, e. g. by heating the system under vacuum to about 200° F. In the absence of water somewhat longer reaction times are required and elevated temperatures should be employed e. g., from about 80° F. to about 400° F. and preferably about 150° F. to about 300° F. so that the salt will dissolve in a reasonable time. In the absence of water the reaction may be completed in about 5 to 30 minutes, usually about 15 minutes at such temperatures. It is especially desirable to employ a water solution of salt when a ratio of salt to polyoxyalkylene compound greater than about 1:8 is employed. The complex may be formed in situ in an organic liquid such as, for example, lubricating viscosity range petroleum oil fraction or gasoline in order to produce a grease or gelled gasoline respectively; or the complex may be prepared apart from and then introduced to such organic liquids with similar results.

Complexes may be produced, in accordance with the present invention, with exceedingly small quantities of salt relative to the quantity of organic reactant employed and the complexes thus prepared are more viscous liquids than the original polyoxyalkylene compounds but for practical purposes the ratio of salt to polyoxyalkylene compound should be no lower than about 1:15 by weight and more preferably at least about 1:8. At a ratio of about 1:8 the complexes formed are substantially non-fluid grease-like gels and as the ratio is increased up to about 1:1 the complexes produced are progressively more solid until a hard product is obtained. It should be understood that the nature of the complexes obtained varies substantially with the particular metal salt employed, the particular polyoxyalkylene compound, the ratio of salt to polyoxyalkylene compound, the number of $(C_mH_{2m}O)$ groups in the compound, etc. It is a simple matter, however, to determine for any pair of reactants the proper proportions to give a desired product. Brittle solid products may be obtained with polyoxyalkylene compounds and $CaCl_2$ when employing somewhat lower ratios, i. e. less $CaCl_2$, than with other salts tried.

The operating examples set forth in Table 1 are included to specifically illustrate the present invention without the intention of necessarily limiting the same. In addition to the results of experiments set forth in Table 1, additional experiments were carried out in which no emphasis was placed on the relative proportions of salt and polyoxyalkylene compound but which were conducted for the sole purpose of determining whether or not certain materials would in fact form complexes. Other polyoxyalkylene compounds and metal salts not set forth in the experiments listed in Table 1 but which conform to the definitions hereinabove stated will form complexes in a similar manner. In other tests, for example, the dioleate of a polyethylene glycol having a molecular weight of about 300 was complexed with $CaBr_2$ and $CaNO_3$, and $C_{18}H_{27}O(C_2H_4O)_{13}COCH_3$ was found to complex with $CaCl_2$, etc.

Table 1

| Exam. | Polyoxyalkylene Compound | Metal Salt | Ratio of Salt to Polyoxyalkylene Compound | Temp., °F. | Remarks |
|---|---|---|---|---|---|
| 1 | $RO(C_2H_4O)_{12}H$ (1) | $CaCl_2$ | 1:10 | 195 | Highly viscous liquid.[a] |
| 2 | $t\text{-}C_{12}H_{25}S(C_2H_4O)_{11}H$ | $CaCl_2$ | 1:5 | 195 | Semi-solid product.[a] |
| 3 | $t\text{-}C_{12}H_{25}S(C_2H_4O)_{11}H$ | $CaCl_2$ | 1:2.5 | 195 | Hard solid product.[a] |
| 4 | $n\text{-}C_{12}H_{25}S(C_2H_4O)_8H$ | $CaCl_2$ | 1:2.5 | 302 | Grease—easily removed from hands, etc. with cold water.[b] |
| 5 | $n\text{-}C_{12}H_{25}S(C_2H_4O)_8H$ | $MnCl_2 \cdot 4H_2O$ | 1:2.33 | 302 | Grease-like product—stable to continued heating at 302° F. |
| 6 | $n\text{-}C_{12}H_{25}S(C_2H_4O)_8H$ | $CuBr_2$ | 1:2.33 | 195 | Hard solid product.[a] |
| 7 | $n\text{-}C_{12}H_{25}S(C_2H_4O)_8H$ | $CuBr_2$ | 1:4 | 300 | Gelled hydrocarbon.[a,c] |
| 8 | $n\text{-}C_{12}H_{25}S(C_2H_4O)_8H$ | $Ca(NO_3)_2$ | 1:3.33 | 302 | Clear grease.[b] |
| 9 | $n\text{-}C_{12}H_{25}S(C_2H_4O)_8H$ | $CaCl_2$ | 1:3.33 | 302 | Opaque light colored grease.[d] |
| 10 | $n\text{-}C_{12}H_{25}S(C_2H_4O)_8H$ | $Ca(C_2H_3O_2)_2$ | 1:3 | 195 | Putty-like solid. |
| 11 | $t\text{-}C_{12}H_{25}S(C_2H_4O)_{11}H$ | $ZnCl_2$ | 1:5 | 300 | Opaque, hard solid. |
| 12 | $t\text{-}C_{12}H_{25}S(C_2H_4O)_{11}H$ | $CoCl_2$ | 1:5 | 300 | Blue, highly viscous liquid. |
| 13 | $t\text{-}C_{12}H_{25}S(C_2H_4O)_{11}H$ | $CuCl_2$ | 1:5 | 300 | Viscosity of nonionic substantially increased. |
| 14 | Formal of Igepal CA (2) | $CaCl_2$ | 1:4 | 302 | Clear tacky solid.[a] |
| 15 | Polyethylene glycol (mol. wt. of about 300). | $CaCl_2$ (anhydrous) | 1:36 | 366 to 390 | Viscosity of nonionic substantially increased. |
| 16 | ....do.... | $CaCl_2$ (anhydrous) | 1:18 | 366 to 390 | Viscosity substantially increased over product of Exam. 15. |
| 17 | ....do.... | $CaCl_2$ (anhydrous) | 1:8 | 366 to 390 | Complex has appearance and viscosity similar to honey. |
| 18 | ....do.... | $CaCl_2$ (anhydrous) | 1:2 | 366 to 390 | Solid putty-like complex. |
| 19 | Ethofat 242/25 (3) | $CaCl_2$ | 1:2.5 | 200 | Hard wax-like solid. |
| 20 | Ethomid C/25 (4) | $CaCl_2$ | 1:2.5 | 200 | Powder. |
| 21 | Ethomeen T/25 (5) | $CaCl_2$ | 1:2.5 | 200 | Tacky solid. |
| 22 | Tween 20 (6) | $CaCl_2$ | 1:2.5 | 200 | Hard brittle solid.[a] |

(1) R represents the alkyl radical derived from cocoanut alcohol which was the hydrophobic reactant employed in preparing the organic reactant.

(2) $[C_{14}H_{21}O(CH_2CH_2O)_7]_2CH_2$ (3) $R\overset{O}{\overset{\|}{C}}\text{—}O(C_2H_4O)_nH$ wherein R is derived from a mixture comprising 70% Rosin fatty acids; contains 15$(C_2H_4O)$ groups. (Product of Armour and Company.)

(4)  wherein R is derived from Coco amine; contains total of 15$(C_2H_4O)$ groups. (Product of Armour and Company.)

(5) $RN\begin{smallmatrix}(C_2H_4O)_nH \\ \diagdown \\ (C_2H_4O)_nH\end{smallmatrix}$ wherein R is derived from Tallow amine; contains total of 15$(C_2H_4O)$ groups. (Product of Armour and Company.)

(6) Monolaurate derivative of anhydrosorbitol wherein free hydroxyls are reacted with a number of mols of ethylene oxide. (Product of Atlas Powder Co.)

[a] Water solution of salt employed; complex formed at ambient temperature and water driven off at temperature indicated (in vacuo when below 212° F.).
[b] Complex formed in presence of lubricating viscosity range petroleum oil.
[c] Complex formed in presence of kerosene.
[d] Complex formed in presence of a synthetic lubricating viscosity range oil viz., Ucon 818.

$$C_7H_{15}\overset{O}{\overset{\|}{C}}\text{—}O(C_2H_4O)_4\overset{O}{\overset{\|}{C}}\text{—}C_7H_{15}$$

The grease-like and solid complexes of the present invention may be employed to gel various organic liquids which may include, for example, crude or refined petroleum hydrocarbons, such as gasoline, kerosene, naphtha, fuel oil, diesel oil, lubricating oil, etc.; chlorinated hydrocarbons or oxygen containing compounds such as the polyalkylene glycols, etc. may be gelled thereby; animal oils such as lard oil or fish oil, and vegetable oils such as cottonseed oil or the like and mixtures of these may be thickened or gelled by the complexes of the present invention.

Those complexes having a salt to polyoxyalkylene compound ratio of at least about 1:8 may be employed for thickening or gelling organic liquids, particularly petroleum fractions boiling in the range of from about 100° F. to about 1000° F. Gelled petroleum distillates, for example gasoline, have several important uses, probably the most important of which, at the present time, is for the military in flame throwers and gelled gasoline bombs.

Gelled or thickened oily fluids in general, e. g. petroleum distillates which have been substantially increased in viscosity by the introduction of a complex of the present invention, have further outstanding suitability for use in the Hydrafrac process (described in the Oil and Gas Jour., October 14, 1948, page 76, et seq.) wherein a viscous oily fluid containing a propping agent such as sand is forced under pressure into a producing formation in an oil well in order to cause a fracture in the formation following which the thickened oil is caused to change in viscosity characteristics from a high to a low viscosity so that it may readily be displaced from the formation to permit oil from the formation to flow into the well bore.

The usual practice at the present time is to employ a separate and distinct gel breaker in order to cut the viscosity of the gelled oil after the fracture has been made so that the fracturing fluid will flow back out of the fracture. By employing an oil thickened with a complex of the present invention no gel breaker is needed in as much as the hygroscopic nature of these complexes is such as to cause the oil to lose its gel characteristics over a relatively short period of time when in contact with water in any substantial amount. Thus, water seeping through the fracture will break the gel and, in a relatively short time, cause the viscosity of the gelled oil to be reduced to a point where it will flow from the formation in a manner essentially identical to that resulting from the use of a gel breaker.

About 1 percent to about 60 percent by weight of the complexes of the present invention, based upon the liquid hydrocarbon, and preferably between about 5 percent and about 30 percent of the complex produces a suitable gel for suspending the propping agent, e. g., sand, etc., in the hydrocarbon. The nature of the complex will dictate, to a substantial extent, the amount employed, that is, a smaller amount of a complex prepared with a ratio of salt to organic reactant of more than about 1:3 may be employed than with the softer complexes having a ratio of between about 1:8 and about 1:4.

As indicated in Table 1, the complexes of the present invention may be employed to thicken lubricating viscosity range oleaginous vehicles such as petroleum oils or synthetic lubricants such as Ucon 818 a product of Carbide and Carbon Chemical Corporation having a formula assumed to be

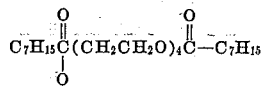

The greases thus prepared have, for the most part, the interesting property of being readily removed from hands, equipment, etc. by cold water. An amount of from about 3 percent to about 20 percent by weight of complexes having a ratio of salt to polyoxyalkylene compound of at least about 1:4 may be employed for this purpose. An unexpectedly advantageous use for the complexes of the present invention has been to incorporate them in ordinary soap greases for the purpose of increasing the stability characteristics thereof; for example, a complex resulting from the reaction of 10 grams of the dioleate of a polyethylene glycol having a molecular weight of about 400 and 3 grams of Ca(NO₃)₂ was added in an amount of about 2 percent to a dehydrated calcium soap cup grease resulted in an increase in both mechanical stability and thermal reversibility of the grease.

Complexes of the nonionic surfactant materials in general and particularly the mercapto-polyethoxy nonionic compounds are highly effective as components of a so-called mechanics-soap. A mechanics soap, i. e. a heavy duty detergent such as is required by garage attendants and the like whose hands are begrimed by frequent contact with various petroleum products, combines high solvency for the grime, usually oil or grease, with simplicity of removal from the hands after removing the grime. For this purpose an organic solvent is usually required to remove the oil or grease and a surface active substance capable of emulsifying that solvent with water, so that it may be readily washed from the hands, is usually incorporated therein. It is, however, highly desirable that such detergents be in the form of a paste or viscous liquid so that they may be worked into the hands without running off before the solvent has removed the grime. The mercapto-polyethoxy-inorganic salt complexes when employed in an amount of from about 10 percent to about 50 percent by weight and preferably from about 15 percent to about 30 percent serve the dual purpose of gelling the solvent and furnishing the surfactant material. Fillers or abrasives may be used advantageously in such a heavy duty detergent. Examples of such substances are tripoli, infusorial earths, sawdust, etc. Scents such as that of pine oil or the like may be incorporated if desired and such compounds as lithopone may likewise be added for the purpose of enhancing the appearance of the final product.

The use of a small quantity of an alkali or alkaline earth metal soap of a higher fatty acid, e. g. calcium stearate, calcium oleate, magnesium laurate, etc. is advantageous for the purpose of reducing any tendency of the solvent to leak from the composition.

I claim:

1. The product prepared by reacting at a temperature of about 60° F. to about 400° F. (1) an inorganic metal salt consisting of a polyvalent metal and a monovalent anion which salt is characterized by an ability to form an alcoholate with a low molecular weight alcohol with (2) a polyoxyalkylene compound conforming to the empirical formula:

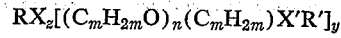

wherein R and R' represent constituents selected from the group consisting of hydrogen and a hydrocarbon radical containing 1 to about 30 carbon atoms; X represents a constituent selected from the group consisting of oxygen, sulfur, nitrogen, —NH—,

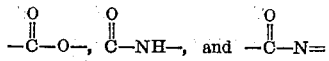

X' represents a constituent selected from the group consisting of oxygen,

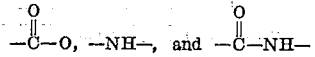

$m$ represents a positive integer selected from the group consisting of 2 and 3; $n$ represents a positive integer between 1 and about 30; $y$ represents a positive integer between 1 and 4 inclusive; and $z$ represents a positive integer between 1 and 4 inclusive said inorganic salt and said polyoxyalkylene compound being reacted in a ratio by weight within the range of 1 part of metal salt to 1 part of polyoxyalkylene compound and 1 part of metal salt to about 15 parts of polyoxyalkylene compound.

2. The product of claim 1 which has been prepared from a polyoxyalkylene compound wherein R is a hydrocarbon radical, X' is oxygen, R' is hydrogen, $y$ is 1 and $z$ is 1.

3. The product of claim 1 which has been prepared from a polyoxyalkylene compound wherein R is a hydrocarbon radical, X is sulfur, X' is oxygen, R' is hydrogen, $y$ is 1, and $z$ is 1.

4. The product of claim 1 which has been prepared from a polyoxyalkylene compound wherein R is a hydrocarbon radical, X is oxygen, X' is oxygen, R' is hydrogen, $y$ is 1, and $z$ is 1.

5. The product of claim 1 which has been prepared from a polyoxyalkylene compound wherein R is hydrogen, X is oxygen, X' is oxygen, R' is hydrogen, $y$ is 1, and $z$ is 1.

6. The product prepared by reacting at a temperature of about 60° F. to about 400° F. (1) an inorganic metal salt consisting of a polyvalent metal and a monovalent anion which salt is characterized by an ability to form an alcoholate with a low molecular weight alcohol with (2) a polyoxyalkylene compound conforming to the empirical formula:

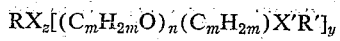

wherein R and R' represent constituents selected from the group consisting of hydrogen and a hydrocarbon radical containing 1 to about 30 carbon atoms; X represents a constituent selected from the group consisting of oxygen, sulfur, nitrogen, —NH—,

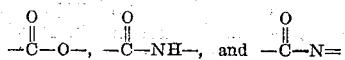

X' represents a constituent selected from the group consisting of oxygen,

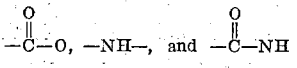

$m$ represents a positive integer selected from the group consisting of 2 and 3; $n$ represents a positive integer between 1 and about 30; $y$ represents a positive integer between 1 and 4 inclusive; and $z$ represents a positive integer from 1 to 4 inclusive; said salt and said polyoxyalkylene compound being present in said product in a ratio range of about 1 part by weight of salt to 8 parts by weight of polyoxyalkylene compound and 1 part by weight of salt to 1 part by weight of polyoxyalkylene compound.

7. The composition consisting essentially of an organic liquid boiling in the range of from about 100° F. to about 1000° F. thickened by an amount of from about 3 percent to about 60 percent by weight, based on total composition, of the product of claim 6.

8. The composition consisting essentially of a hydrocarbonaceous liquid boiling in the range of from about 100° F. to about 1000° F. thickened by an amount of from about 3 percent to about 60 percent by weight, based on total composition, of the product of claim 6.

9. The composition consisting essentially of an organic liquid boiling in the range of from about 100° F. to about 1000° F. which has been thickened by an amount of from about 3 percent to about 60 percent by weight, based on total composition, of the product prepared by reacting at a temperature of about 60° F. to about 400° F. (1) an inorganic metal salt consisting of a polyvalent metal and a monovalent anion which salt is characterized by an ability to form an alcoholate with a low molecular weight alcohol with (2) a polyoxyalkylene compound conforming to the empirical formula:

$$RX_z[(C_mH_{2m}O)_n(C_mH_{2m})X'R']_y$$

wherein R represents a hydrocarbon radical containing from about 6 to about 30 carbon atoms; X represents a constituent selected from the group consisting of sulfur and oxygen; m represents a positive integer selected from the group consisting of 2 and 3; n represents a positive integer between 1 and about 30; X' represents oxygen; R' represents hydrogen; y represents a positive integer between 1 and 4 inclusive; z represents a positive integer between 1 and 4 inclusive; said salt and said polyoxyalkylene compound being present in said product in a ratio range of about 1 part by weight of salt to 8 parts by weight of polyoxyalkylene compound and 1 part by weight of salt to 1 part by weight of the polyoxyalkylene compound.

10. The composition of claim 9 wherein the organic liquid is a petroleum fraction and the product employed to thicken said organic liquid is prepared from an inorganic metal salt and a polyoxyalkylene compound wherein R is an alkyl hydrocarbon radical containing 12 carbon atoms; X is sulfur; m is 2; X' is oxygen; R' is hydrogen, y is 1, and z is 1.

11. The composition of claim 10 wherein the metal salt is $CaCl_2$.

12. The method which comprises reacting at a temperature of about 60° F. to about 400° F. (1) a metal salt consisting of a polyvalent metal and a monovalent anion which salt is characterized by an ability to form an alcoholate with a low molecular weight alcohol with (2) a polyoxyalkylene compound conforming to the empirical formula:

$$RX_z[(C_mH_{2m}O)_n(C_mH_{2m})X'R']_y$$

wherein R and R' represent constituents selected from the group consisting of hydrogen and a hydrocarbon radical containing 1 to about 30 carbon atoms; X represents a constituent selected from the group consisting of oxygen, sulfur, nitrogen, —NH—,

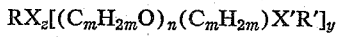

X' represents a constituent selected from the group consisting of oxygen,

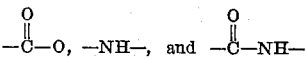

m represents a positive integer selected from the group consisting of 2 and 3; n represents a positive integer between 1 and about 30; y represents a positive integer between 1 and 4 inclusive; and z represents a positive integer between 1 and 4 inclusive said inorganic salt and said polyoxyalkylene compound being reacted in a ratio by weight within the range of 1 part of metal salt to 1 part of polyoxyalkylene compound and 1 part of metal salt to about 15 parts of polyoxyalkylene compound.

13. The method of claim 12 wherein a water solution of the metal salt is employed and the water is removed after the reaction is complete.

14. The method of claim 13 wherein the metal salt is $CaCl_2$.

15. The method which comprises reacting (1) an inorganic metal salt consisting of a polyvalent metal and a monovalent anion which salt is characterized by an ability to form an alcoholate with a low molecular weight alcohol with (2) a polyoxyalkylene compound conforming to the empirical formula:

$$RX_z[(C_mH_{2m}O)_n(C_mH_{2m})OH]_y$$

wherein R represents a hydrocarbon radical containing 1 to about 30 carbon atoms; X represents a constituent selected from the group consisting of oxygen and sulfur; m represents a positive integer selected from the group consisting of 2 and 3; n represents a positive integer between 1 and about 30; y represents a positive integer between 1 and 4 inclusive; and z represents a positive integer between 1 and 4 inclusive; said inorganic metal salt and said polyoxyalkylene compound being reacted at a temperature in the range of from about 60° F. to about 400° F. and in a ratio on a weight basis of salt to polyoxyalkylene compound within the range of 1:1 to about 1:15.

16. The method of claim 15 wherein R is an alkyl hydrocarbon radical containing from about 6 to about 30 carbon atoms; X is sulfur, m is 2, y is 1, and z is 1.

17. The method of claim 16 wherein R contains 12 carbon atoms.

References Cited in the file of this patent

UNITED STATES PATENTS

| Number | Name | Date |
|---|---|---|
| 2,327,053 | Marple et al. | Aug. 17, 1943 |
| 2,380,185 | Marple et al. | July 10, 1945 |
| 2,388,887 | Weissberger et al. | Nov. 13, 1945 |
| 2,420,308 | Gates | May 13, 1947 |
| 2,532,391 | Bersworth | Dec. 5, 1950 |
| 2,537,493 | Thurston et al. | Jan. 9, 1951 |

OTHER REFERENCES

Gomer et al.: J. Am. Chem. Soc., vol. 66, pages 1331–3 (1944), abstracted in Chem. Abs., vol. 38, col. 5465² (1944).

Traube et al.: Ber., vol. 69B, pages 2655–63, abstracted in Chem. Abs., vol. 31, col. 1765⁸ (1937), abstract used as the reference